Oct. 31, 1939.    J. J. PALOTCE    2,178,491
BEARING HONE
Filed April 3, 1939
Fig.1.
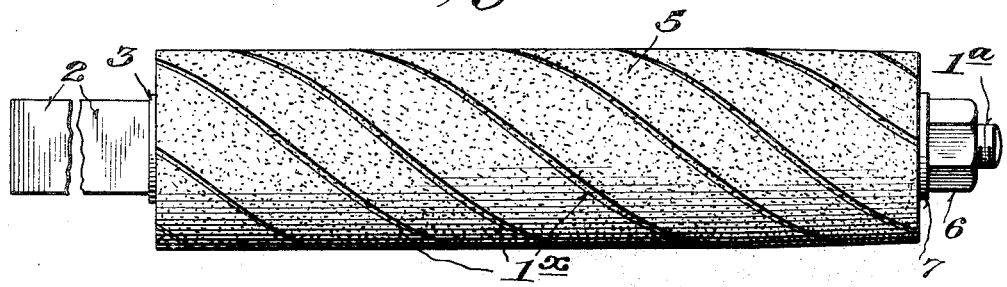
Fig.2.
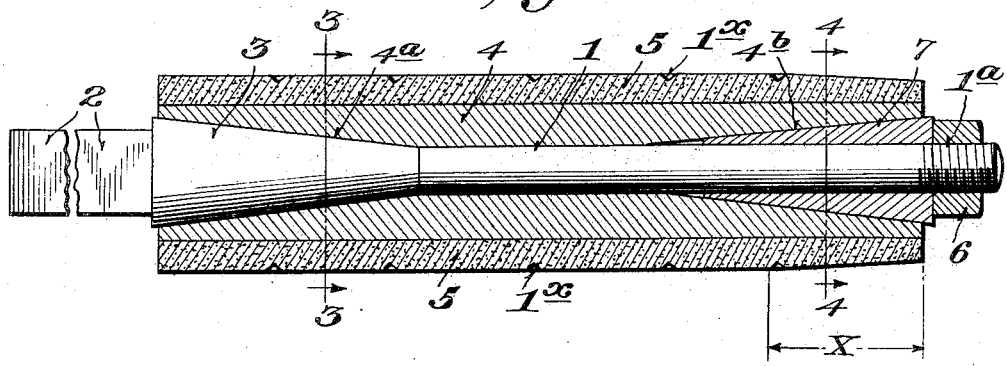
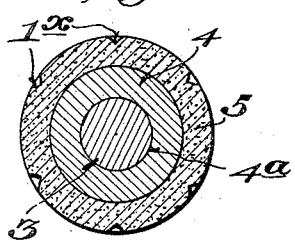 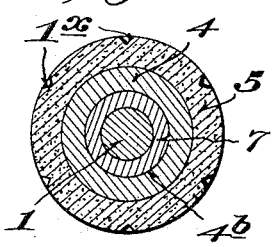 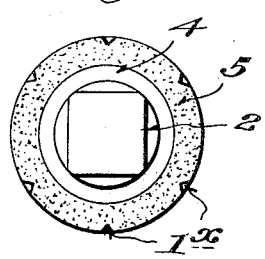
Fig.3.    Fig.4.    Fig.5.
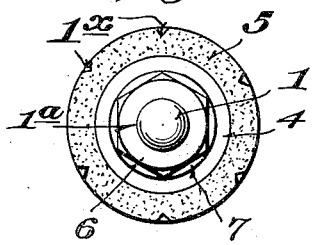
Fig.6.
Inventor
John J. Palotce
By Alexander Dowell
Attorneys Patented Oct. 31, 1939

2,178,491

UNITED STATES PATENT OFFICE 2,178,491

BEARING HONE

John J. Palotce, Youngstown, Ohio

Application April 3, 1939, Serial No. 265,815

1 Claim. (Cl. 51—206)

This invention is a novel improvement in abrasive hones, and the principal object thereof is to provide a simple, novel and efficient hone having lasting qualities, and consisting of a pilot shaft having an elongated grinding cylinder of stone of relatively small diameter mounted thereon, said cylinder being fixedly mounted upon a hollow metalic core having relatively long opposed conical enlargements at both ends of the bore extending substantially towards the center of the core, and said pilot shaft having a complemental conical bearing surface conforming with the enlargement at the inner end of the bore, and having a threaded outer end provided with a nut, a conical bearing sleeve complemental with the conical enlargement at the outer end of the bore being disposed on the shaft between the nut and core, whereby when the nut is tightened the stone grinding cylinder will be locked against rotation on the pilot shaft entirely by friction between the conical ends of the bore and the corresponding bearing surfaces of the shaft and sleeve, thus eliminating the necessity of providing washers or other members contacting with the outer end of the stone cylinder or its core.

Another object of the invention is to provide an elongated cylindrical stone hone of relatively small diameter possessing certain novel features of construction hereinafter set forth whereby the hone, when wet or dry, will be particularly adapted for insertion into, for the purpose of grinding, machining, finishing, polishing, or boring, bearings of relatively small diameter, such as crank-shaft bearings, connecting-rod bearings, wrist pin bearings, main bearings, or the like, although the hone may be used for many other purposes. The present shell-type bearings customarily used in motors and engines, are usually pressed-out instead of being ground or reamed, but such pressing operations have not been found entirely satisfactory since it is practically impossible to obtain a perfect fit by such method. Pressed shell-type bearings must have a perfect finished surface in order to give satisfactory service, and it has been found necessary to use a hone thereon in order to obtain such perfect surface. Manufacturers have heretofore been forced to discard thousands of bearings because they were not properly fitted and for such reason were not of lasting quality. My novel hone is particularly adapted for manual use in motor plants and in service and repair garages for the purpose of aligning the bearings and for providing perfect wearing surfaces whereby the life of the bearings will be greatly increased over and above the normal life of bearings which are at present aligned by the usual pressing-out method above mentioned.

A further object is to provide an elongated cylindrical hone of stone of relatively small diameter, having a slight taper at its outer end to facilitate entry of the hone into the bearing to be ground or bored; also to provide on the surface of such cylinder a plurality of spiral grooves extending throughout the length thereof to provide spaces wherein the cuttings or grindings may accumulate and pass off, which cuttings might otherwise build-up or increase the effective diameter of the hone and throw same off-center.

I will explain the invention with reference to the accompanying drawing which illustrates one practical embodiment thereof to enable others to adopt and use the same; and will summarize in the claim the novel features of construction, and novel combinations of parts, for which protection is desired.

In said drawing:

Fig. 1 is a plan view of the assembled hone.

Fig. 2 is a longitudinal section therethrough.

Fig. 3 is a transverse section on the line 3—3, Fig. 2.

Fig. 4 is a transverse section on the line 4—4, Fig. 2.

Fig. 5 is an end view of the inner end of the hone; and

Fig. 6 is an end view of the outer end thereof.

As shown, the hone assembly comprises an elongated pilot shaft 1 having its inner end 2 machined into polygonal cross-section. On shaft 1 adjacent portion 2 is an elongated conical enlargement 3 forming a bearing for the inner end of the hollow core 4 of the grinding cylinder 5, and the outer end of the shaft 1 is threaded as at 1a to receive a nut 6.

The grinding cylinder 5 comprises a tube of abrasive stone fixedly mounted upon the hollow metallic core 4 so as to form a unitary structure therewith, the length of the stone is somewhat less than the portion of the pilot shaft from the larger end of bearing portion 3 to the nut 6 on the threaded portion 1a. In each end of the bore in core 4 is a conical enlargement extending towards the center of the core, the enlargement 4a at the inner end of the bore conforming with and being complemental to the conical bearing surface 3 of shaft 1.

In the outer end of shaft 1 is a conical sleeve 7 conforming with and being complemental to the conical enlargement 4b at the outer end of the bore in core 4. Conical sleeve 7 makes a sliding fit upon the shaft 1, and is adapted to enter the enlargement 4b of outer end of the bore in core 4 and form the outer bearing for said core and to maintain the cylinder 5 positioned on shaft 1. Sleeve 7 is interposed between the core 4 and nut 6, as indicated in Fig. 2, and thus when nut 6 is tightened sleeve 7 will be shifted inwardly of shaft 1 and the stone 5 will be held against rotation on the shaft by friction of the conical surface 3 of the shaft and that of sleeve 7 bearing against the corresponding enlargements 4a and 4b of the bore in core 4 of the grinding cylinder, thereby eliminating use of keys or other means for locking the cylinder to the shaft. Thus the conical members 3 and 7 center the cylinder on the shaft, while nut 6 provides a readily accessible and simple means for locking the cylinder against rotation on the shaft without actually contacting the outer end of the cylinder 5 or its core 4.

The grinding cylinder 5 is preferably slightly tapered at its outer end throughout the portion denoted by the line x (Fig. 2) to facilitate entry of the hone into the bearing which is to be ground or polished. Also the surface of the stone cylinder 5 is preferably, but not necessarily, provided with a plurality of spiral grooves 1x (six such spiral grooves being indicated in Figs. 3-6 inclusive), same providing recesses which will permit accumulations of cuttings and grindings to pass off to one side, which cuttings if not removed might build up the effective diameter of the hone and throw same off-center.

The hone, above described, may be used for grinding, polishing, finishing, machining, or boring bearings of small diameter, such as crankshaft or main or connecting-rod or wrist pin bearings, or the like. Grinding cylinders of various diameters may be used on the same shaft 1, provided the cores thereof each have conical enlargements to suit the conical bearing surfaces 3 and 7; and thus the shaft 1 may be used in connection with a series of stones to provide hones of various diameters.

I do not limit my invention to the exact form shown in the drawing, for obviously changes may be made therein within the scope of the claim.

I claim

A hone of the character described, comprising a shaft having a relatively long conical enlargement intermediate its ends forming a bearing; a sleeve slidably mounted on said shaft and having an opposed conical surface substantially corresponding with that of the shaft enlargement and forming a second bearing; an elongated grinding cylinder comprising a bonded abrasive and a metallic core of relatively small diameter provided with a bore mounted on said shaft embracing the bearings, said bore having opposed conical enlargements in its ends conforming throughout their lengths with the conical surfaces of the said bearings; and means on the shaft engaging the outer end of the sleeve to shift same axially of the shaft and thereby frictionally lock the core against rotation on the shaft.

JOHN J. PALOTCE.